No. 694,929. Patented Mar. 4, 1902.
D. H. HOUSTON.
FOLDING PANORAMIC CAMERA.
(Application filed July 20, 1901.)
(No Model.)
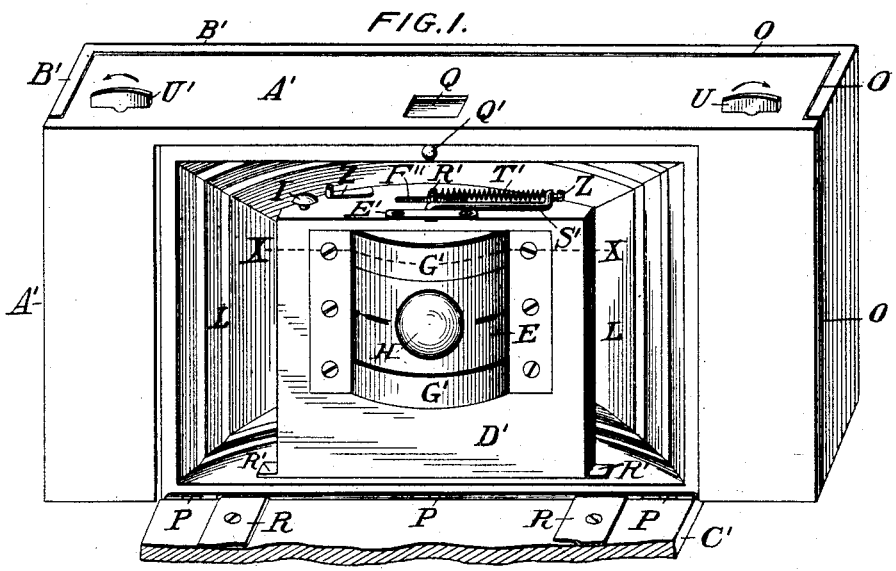
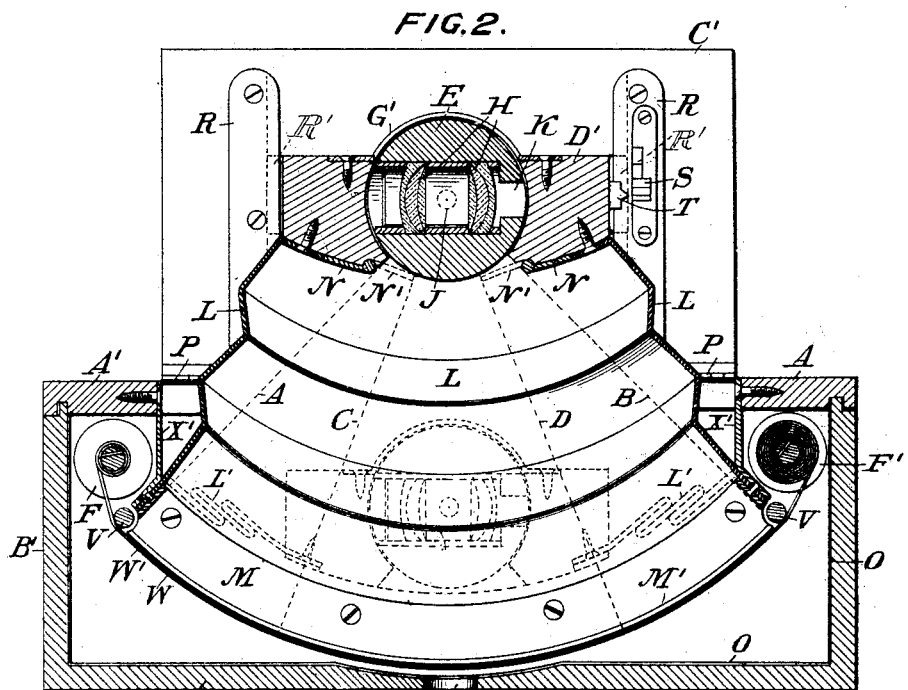
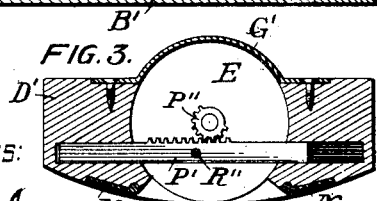
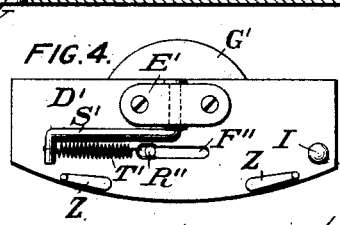
Witnesses:
G. F. Downing
H. W. Bright
Inventor
David H. Houston.

UNITED STATES PATENT OFFICE.

DAVID H. HOUSTON, OF HUNTER, NORTH DAKOTA.

FOLDING PANORAMIC CAMERA.

SPECIFICATION forming part of Letters Patent No. 694,929, dated March 4, 1902.

Application filed July 20, 1901. Serial No. 69,102. (No model.)

*To all whom it may concern:*

Be it known that I, DAVID H. HOUSTON, a citizen of the United States, residing at Hunter, in the county of Cass and State of North Dakota, have invented certain new and useful Improvements in Folding Panoramic Cameras; and I do hereby declare the following to be a full, clear, and exact description of the invention, such as will enable others skilled in the art to which it appertains to make and use the same.

My invention relates to folding panoramic cameras, and has for its object the provision of a folding panoramic camera adapted to use the rolls of sensitized film on the market and generally known as "daylight-loading film-cartridges."

The principal object of my invention is the provision of a folding panoramic camera of novel construction adapted to fold into compact form and having a circular-shaped lens-mount pivoted to oscillate within the camera-front, which front is adapted to be projected forward through the media of a support and bellows connecting the front to the camera.

The camera-front containing the pivoted oscillating lens-mount closes the front of the bellows of the camera and, together with the bellows, folds into the central concave front compartment of the camera, and the camera front and bellows may be supported upon any suitable extensible supporting structure which is adapted to be extended forward from and folded back into the camera-casing.

My invention contains many features of construction which combine to make a very compact camera when folded, and when unfolded the camera is well adapted to combine with much longer focused lenses than can be combined advantageously with a non-folding panoramic camera, and the longer-focused lens which can be combined with my camera gives a much more desirable panoramic picture than a shorter-focused lens.

My invention consists of a folding panoramic camera having novel features of construction and combination of parts, which are pointed out in the claims of the specification.

In the drawings similar characters of reference denote similar parts.

Figure 1 is a perspective view of my camera with the front of the camera-casing open and showing the camera-front and the camera-bellows folded into the central compartment of the camera. Fig. 2 is a central sectional plan view of my camera, showing the front of the camera-casing opened and the camera front and bellows extended in a position for use. Fig. 3 is a cross-sectional view of the camera-front on the line X X of Fig. 1, showing the top side of the circular-shaped mount for the lens and the geared pinion and geared sliding bar for actuating the lens-mount. Fig. 4 is a top plan view of the camera-front, showing the reversible crank and reversible motor-spring connection.

A' indicates the camera-casing; B', the removable rear side and ends of the camera-casing; C', the open front of the camera-casing; D', the camera-front; E, the circular-shaped lens-mount; E', the keeper of the crank-shaft; F, the reel-spool; F', the supply-spool; F'', the slot for the pin R'' to slide in; Q, the finder; Q', the finder-lens; G', the light-excluding bands over the ends of the oscillating mount; I, the touch-button; J, the position of the pivoted shaft of the circular mount for the lens; K, the rear aperture of the lens-mount; L, the bellows; L', the position of the bellows when folded; M, the lower side of the circular frame for the rear end of the bellows; M', the lower one of the circular guides for the sensitized film, which guide is formed from the turned edge of the metallic frame M.

At N are shown the folding ray-intercepting gates. N' points out the position of the folding ray-intercepting gates when folded inward.

At O are shown the lines where the rear side and the ends of the camera-casing part from the camera; P, the hinges of the front of the camera-casing; P', the geared sliding bar; P'', the pinion on the shaft of the oscillating mount for the lens; R, the guides for the camera-front; R', the flanges that slide under the guides R and hold the camera-front to the front of the casing; R'', the pin in the geared sliding bar; S, the focusing-scale; S', the reversible crank; T, the pointer; T', the motor-spring; U, the key of the reel-spool; U', the key of the supply-spool; V, the guide-rollers; W, the sensitized film; W', the wrapper of the sensitized film; X' compartment-divisions; Y, the sight-aperture; Z, the handle of the ray-intercepting gates.

A B are dotted lines showing the outer limit of the light-rays that are used to impress the film; C D, dotted lines showing the outer limit of the light-rays which pass the gates when the gates are closed.

The drawings show a camera adapted to include an angle of ninety degrees, which has in combination with the front two ray-intercepting gates N, that are adapted to fold inward, and thereby reduce the field used. Thus when desired the camera can be adapted to make views of an ordinary angle of forty-five degrees, and thereby make pictures of half the full length, or by folding inward only one of the ray-intercepting gates an angle of about sixty-seven degrees can be used to make pictures of three-fourths the full length.

The oscillating lens-mount is operated to turn a half-circle forth and back, so that the lens is always closed after passing over the view and is always in a position to operate after the crank S' is reversed, and a touch of the finger given to the touch-button will release the oscillating lens-mount to turn a half-circle in either way—forth or back—by the force of the motor-spring T'.

On the pivot-shaft of the oscillating lens-mount is a geared pinion P'', which is meshed into a geared sliding bar P', and the geared sliding bar has a center pin R'', to which center pin is connected a motor-spring T', which spring is connected to a reversible crank S', so that when the crank is reversed to the opposite side the motor-spring can actuate the oscillating lens-mount to turn a half-circle in the opposite direction from the crank.

To operate the camera, remove the removable rear side and ends of the camera-casing, insert a supply-spool of cartridge-film into the camera in the usual manner, attach the end of the opaque wrapper of the film to the reel-spool, then close the camera-casing, turn the reel forward, thus winding forward the wrapper of the sensitized film until the first number or indicia on the wrapper comes opposite to the sight-aperture in the rear of the casing, and thus the camera is charged with sensitized film and ready for use.

To use the camera, open the folding front of the casing and extend the bellows forward by sliding the front of the camera forward until the pointer T points to the desired mark on the scale for indicating the focal distance of the lens from the sensitized film. Then turn the reversible crank over and the coiled spring will be extended in the proper direction to rotate the oscillating lens-mount. Then, holding the camera level and pointing the camera to the center of the view, touch the touch-button and the circular lens-mount will turn a half-turn, thereby passing the lens over the field of view, and an actinic impression will be produced upon the sensitized film as extended in a circle behind the film-guides. Then close in the front and bellows into the front central compartment of the camera and shut the folding front of the camera-casing. After making an exposure on a view the sensitized film should be wound forward in position for the next view.

If a view of three-fourths the full length is desired to be made, then wind the film back a quarter part of the full length of the view and close inward the right-hand ray-intercepting gate N, and if a view of half the full length is required to be made close inward both of the ray-intercepting gates N and wind the film forward a quarter part of the full length of the view. The wrapper of the film for this camera should be numbered for each quarter of the picture and as many numbers passed to the sight-aperture as required to be used. A note-book can be kept to indicate the numbers on the wrapper of the film where the pictures divide; but in general use the film is best developed by passing it forth and back through a developing solution until the impressions appear sufficiently to show where to cut the pictures apart, when the pictures can be cut apart correctly between the partly-developed impressions, and those needing a longer time to be developed can then be left longer in the developing solution than those having the more full exposures and which develop in a shorter time than the less-exposed ones.

I claim—

1. In a panoramic camera the combination with a suitable casing of a bellows attached at its rear end to the said casing, a front attached to and closing the forward end of said bellows, said front having a circularly-shaped mount for the lens, said circularly-shaped mount pivoted to oscillate light-tight in said front, means for swinging said circularly-shaped mount, a lens mounted in the said circularly-shaped mount, said lens positioned with its forward and rear apertures facing the periphery of the said circularly-shaped mount, circularly-positioned guides for the sensitized film, said guides positioned to guide a sensitized film in the circularly-positioned focal field of a lens mounted with its optical center in the center of said circularly-shaped mount, and means for projecting and supporting the front of the camera in a position where the lens can be focused upon the sensitized film.

2. In a panoramic camera the combination with a suitable casing of a bellows attached at its rear end to the said casing, a front attached to and closing the forward end of said bellows, said front having a circularly-shaped mount for the lens, said circularly-shaped mount pivoted to oscillate light-tight in said front, means for swinging said circularly-shaped mount, a lens mounted in said circularly-shaped mount, said lens positioned with its forward and rear apertures facing the periphery of the said circularly-shaped mount, circularly-positioned guides for the sensitized film, said guides positioned to guide a sensitized film in the circularly-positioned focal field of a lens mounted with its optical center in the center of said circularly-shaped mount, a supply-spool and a reel-spool positioned in said casing, means to wind the sensitized film, and means for projecting and supporting the front of the camera in a position where the lens can be focused upon the sensitized film.

3. In a panoramic camera the combination of a front, said front having pivoted therein an oscillating mount for the lens, a geared pinion upon the pivot of the said oscillating mount, a geared sliding bar adjusted to slide, said geared sliding bar adjusted with its gear in mesh with the geared pinion, a reversible crank adjusted to swing on the center of the said front, an elastic spring connecting the said crank to the said geared sliding bar, means adapted to lock said oscillating lens-mount, and a touch-button and trigger adjusted to release the locked oscillating mount.

4. In a panoramic camera the combination with a suitable casing of a bellows attached at its rear end to said casing, a front attached to and closing the forward end of said bellows, gates adapted to partially close the right and left sides of the rear aperture of said front, said front having a circularly-shaped mount for the lens, said circularly-shaped mount pivoted to oscillate light-tight in said front, means for swinging said circularly-shaped mount, a lens mounted in said circularly-shaped mount, said lens positioned with its forward and rear apertures facing the periphery of the said circularly-shaped mount, circularly-positioned guides for the sensitized film, said guides positioned to guide a sensitized film in the circularly-positioned focal field of a lens mounted with its optical center in the center of said circularly-shaped mount, a supply-spool and a reel-spool positioned in said casing, means to wind the sensitized film, and means for projecting and supporting the front of the camera in a position where the lens can be focused upon the sensitized film.

In testimony whereof I affix my signature in presence of two witnesses.

DAVID H. HOUSTON.

Witnesses:
 GEO. F. DOWNING,
 A. W. BRIGHT.